Patented Oct. 7, 1941

2,257,748

UNITED STATES PATENT OFFICE 2,257,748

PROCESS FOR THE PRODUCTION OF UNSATURATED COMPOUNDS FROM A HEXOSE

William F. Koch, Detroit, Mich.

No Drawing. Application April 16, 1938,
Serial No. 202,469

8 Claims. (Cl. 260—528)

My invention relates to the production of unsaturated bodies from sugars, namely, glucose, fructose and similar substances, and such of their decomposition products as lend themselves to the process.

It is my theory that oxidation of the materials above mentioned can be made to proceed as a peroxidation of unsaturated groups which are produced by the removal of water. Thus in the process of this invention the first step in the oxidation of fructose consists in the removal of hydroxyl from the carbon atom which is in beta position to the carbonyl group and the removal of the hydrogen attached to the carbon in alpha position to the carbonyl group, as a molecule of water. The unsaturated group that is produced is able to add oxygen (activated oxygen) and undergo cleavage at this point with the formation of two carbonyl groups. Thus fructose is split into two, three-carbon chains which may undergo change to lactic acid and related substances, which in turn are able also to undergo loss of water with the production of unsaturated bodies.

In the same way glucose, by losing hydroxyl and hydrogen in the beta and alpha positions, respectively, to the carbonyl group accomplish a desaturation which can add activated oxygen and cleave to form two keto groups, one on a two-carbon chain and the other on a four-carbon chain. By repeating the same process on the four carbon chain, three two-carbon chain groupings are produced which by further desaturation yield highly polymerizing bodies. The positioning of the initial desaturations is accomplished through the catalysis of a halogen, preferably iodine as such or in combination, such as calcium iodide, or an organic form of iodine in which the carrier is a benzine ring or in which an aliphatic chain with or without nitrogen serve as carrier, such, for example, as an iodine compound of creatine.

Active dehydration is produced by a strong mineral acid such as a mixture of fuming and strong sulphuric acid or a comparably strong phosphoric acid.

In the process dry glucose or dry fructose is mixed with an excess of strong mineral acid containing the selected halogen catalyst. The proportion of hexose to acid may be varied, but by way of example I suggest mixing the hexose with from three to six times by weight of a mixture of two parts fuming and one part concentrated sulphuric acid or an equivalently strong phosphoric acid. In case that free iodine is chosen as the halogen catalyst the amount required is preferably less than one-hundredth of one per cent of the amount of hexose used. As to the phosphoric acid, I prefer to employ a mixture of phosphoric anhydride and 85% phosphoric acid in such proportions of each that the mixture contains the minimum amount of water and is still able to flow. The catalyst is added to the acid and to this is added the dry pulverized sugar. The mixture is covered and allowed to stand at about body temperature until the sugar is apparently fully dissolved. The mixture is then warmed gradually to around 100° C., the mixture being well shaken to distribute the heat and prevent overheating of any part, until it reaches a deep burgundy color in which a column, a centimeter in thickness, is almost opaque. The quicker the heating the sooner it reaches the color mentioned. I have found, however, it is better to conduct the process slowly, taking two or three hours for its accomplishment.

According to my interpretation, the dehydrated sugar has, through its free valencies, activated oxygen present and become a peroxide and cleavage has taken place. Some of the desaturated substance under the influence of peroxide has polymerized. As the desaturation and peroxidation and cleavage have resulted in shorter chains of two and three carbon atoms each and further desaturation is accomplished, the desaturated bodies form peroxides which catalyze further polymerization of the unsaturated bodies formed. The polymers thus produced may be cleaved into their component parts by high dilution with water or preferably by distillation. I place the mixture in a flask that is connected with a condenser and pass a stream of gas, such as carbon dioxide, through the apparatus while the mixture is being heated, but below the temperature at which decomposition is so fast as to produce inconvenient foaming, so that the products can be carried over before undergoing too much deleterious decomposition.

In the condensed product is found a mixture of substances containing modified products of the unsaturated substances obtained by the distillation of the polymers and also in equilibrium with them the unsaturated substances desired in sufficient concentration for further dilution and use for treatment of disease.

As mentioned above, my process is directed to the production of unsaturated bodies from hexose and hexose decomposition products, such as their oxidation products and sulphuric and phosphoric acid derivatives. It is to be understood, also, that fuming and concentrated sulphuric acid may be substituted for the strong acid hereinabove referred to.

This application is a continuation in part of my copending application Serial No. 52,344, filed November 30, 1935.

What I claim is:

1. The process which comprises mixing a hexose with a strong mineral acid and iodine as a catalyst, allowing the mixture to stand until the hexose is fully dissolved, then heating the mixture while agitating the same until it reaches a deep burgundy color, and then effecting cleavage of the polymers produced into their component parts by distillation.

2. The process which comprises mixing a hexose with a strong mineral acid and iodine as a catalyst, allowing the mixture to stand until the hexose is fully dissolved, then heating the mixture while agitating the same until it reaches a deep burgundy color, placing the material thus produced in a container connected with a condenser, and while heating passing an inert gas through the container.

3. The process which comprises mixing a hexose with a strong mineral acid and iodine as a catalyst, allowing the mixture to stand until the hexose is fully dissolved, then heating the mixture to around 100° C. while agitating the same until it reaches a deep burgundy color.

4. The process which comprises mixing a hexose with phosphoric acid and iodine as a catalyst, allowing the mixture to stand until the hexose is fully dissolved, then heating the mixture while agitating the same until it reaches a deep burgundy color.

5. The process which comprises mixing a hexose with a strong mineral acid and iodine as a catalyst, allowing the mixture to stand until the hexose is fully dissolved, then heating the mixture while agitating the same until it reaches a deep burgundy color.

6. The process which comprises mixing a hexose with a mixture of phosphoric anhydride and 85% phosphoric acid and iodine as a catalyst, allowing the mixture to stand until the hexose is dissolved, then heating the mixture to around 100° C. until it reaches a deep burgundy color.

7. The process which comprises mixing a hexose with a mixture of phosphoric anhydride and 85% phosphoric acid and iodine as a catalyst, allowing the mixture to stand until the hexose is dissolved, heating the mixture to around 100° C. until it reaches a deep burgundy color, placing the material in a container connected with a condenser and while heating passing carbon dioxide gas through the container.

8. The process which comprises mixing a hexose with a fuming and concentrated sulphuric acid and iodine as a catalyst, allowing the mixture to stand until the hexose is fully dissolved, then heating the mixture while agitating the same until it reaches a deep burgundy color.

WILLIAM F. KOCH.